United States Patent
Magda et al.

(10) Patent No.: US 11,759,936 B2
(45) Date of Patent: Sep. 19, 2023

(54) OFFSET NUT DRIVER

(71) Applicant: Peter Magda, Maspeth, NY (US)

(72) Inventors: Peter Magda, Maspeth, NY (US); Shane Vogt, Lafayette, CO (US)

( * ) Notice: Subject to any disclaimer, the term of this patent is extended or adjusted under 35 U.S.C. 154(b) by 224 days.

(21) Appl. No.: 17/145,344

(22) Filed: Jan. 10, 2021

(65) Prior Publication Data

US 2021/0213597 A1    Jul. 15, 2021

Related U.S. Application Data

(60) Provisional application No. 62/958,758, filed on Jan. 9, 2020.

(51) Int. Cl.
| | |
|---|---|
| *B25F 5/00* | (2006.01) |
| *F16H 1/20* | (2006.01) |
| *B25B 23/00* | (2006.01) |
| *B25B 21/00* | (2006.01) |
| *B25F 5/02* | (2006.01) |

(52) U.S. Cl.
CPC .............. *B25F 5/001* (2013.01); *B25B 21/00* (2013.01); *B25B 23/0035* (2013.01); *F16H 1/20* (2013.01); *B25F 5/026* (2013.01)

(58) Field of Classification Search
CPC ... B25B 21/00; B25B 21/002; B25B 23/0035; B25F 5/001; B25F 5/026; F16H 1/20
USPC ................................. 81/57.14, 57.3
See application file for complete search history.

(56) References Cited

U.S. PATENT DOCUMENTS

| | | | | | |
|---|---|---|---|---|---|
| 3,620,105 | A | * | 11/1971 | Batten ................... | B25B 21/002 81/57.14 |
| 5,339,710 | A | * | 8/1994 | Deadmond ............. | B25B 17/00 81/57.3 |
| 5,460,062 | A | * | 10/1995 | Wilson, Jr. .............. | B25B 13/48 81/57.3 |
| 6,945,139 | B1 | * | 9/2005 | Johnson .................. | B25B 17/00 81/177.2 |
| 7,721,627 | B2 | * | 5/2010 | Basham ..................... | B25C 7/00 81/57.3 |
| 9,718,170 | B2 | * | 8/2017 | Eggert .................. | B25B 13/065 |
| 11,161,226 | B2 | * | 11/2021 | Sawa .................... | B25B 13/467 |
| 2004/0093991 | A1 | * | 5/2004 | Wojtynek ................ | B25B 17/00 81/57.3 |
| 2011/0017023 | A1 | * | 1/2011 | Tutino .................... | B25B 17/02 81/57.3 |
| 2012/0103142 | A1 | * | 5/2012 | Sroka ...................... | B25B 17/02 81/57.3 |

(Continued)

*Primary Examiner* — David B. Thomas
(74) *Attorney, Agent, or Firm* — Tatonetti IP

(57) ABSTRACT

An offset nut driver ("driver") is implemented which enables machine-generated rotational movement at an input drive to translate to an output spline, and thereby to a socket bit, with minimal user effort. Use of the driver displaces, to a power drill, the human strength element in loosening and tightening bolts. Gears interior to the driver translate the rotational movement from the input drive to the output spline. The input drive may be a hex input rod which can connect to a drill's receptacle, or chuck. The output mechanism may be an output spline to which a socket bit can securely connect. The socket bit can then engage with a nut or bolt for loosening or tightening, in which the rotational torque output by the socket bit is derived from the rotational force exerted against the input rod by, for example, a power drill.

11 Claims, 9 Drawing Sheets

(56) References Cited

U.S. PATENT DOCUMENTS

| | | | |
|---|---|---|---|
| 2015/0209943 A1* | 7/2015 | Noel | B25B 17/00 |
| | | | 81/57.24 |
| 2015/0314427 A1* | 11/2015 | Carlsson | B25B 13/481 |
| | | | 81/57.3 |
| 2016/0167207 A1* | 6/2016 | Badiali | B25B 23/0028 |
| | | | 81/57.3 |
| 2020/0331125 A1* | 10/2020 | Eggert | B25B 13/065 |

* cited by examiner

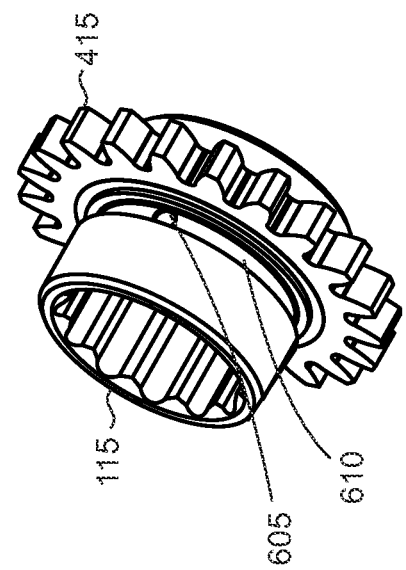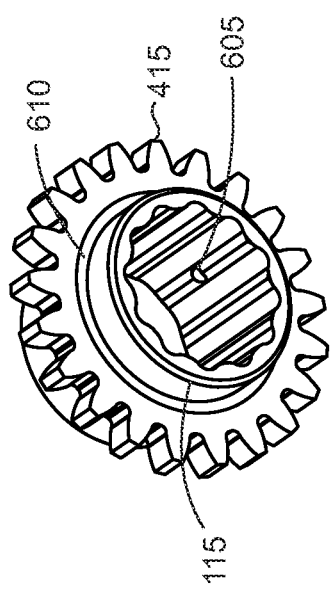
FIG 6

OFFSET NUT DRIVER

CROSS-REFERENCE TO RELATED APPLICATIONS

This non-provisional utility patent application claims the benefit of and priority to U.S. Provisional Patent Application Ser. No. 62/958,758, filed Jan. 9, 2020, entitled "Offset Nut Driver," the entire contents of which is hereby incorporated herein by reference.

BACKGROUND

Some nuts and bolts can be difficult to remove using human strength behind a ratchet and socket bit. Overtime, such repeated work can cause fatigue to workers, hand calluses, and potential injury. For example, exerting strength behind a ratchet can cause a user to collide their knuckles or other portion of their hand against adjacent components which are usually comprised of metal. Even experienced workers can be susceptible to the gradual deterioration of their hand, muscles, and body by using hand tools, such as ratchets.

SUMMARY

An offset nut driver ("driver") is implemented which enables machine-generated rotational movement at an input drive to translate to an output spline, and thereby to a socket bit, with minimal user effort. Use of the driver displaces, to a power drill, the human strength element in loosening and tightening bolts. Gears interior to the driver translate the rotational movement from the input drive to the output spline. The input drive may be a hex input rod which can connect to a drill's receptacle, or chuck, but other shaped and sized input drives may also be used. The output mechanism may be an output spline to which a socket bit can securely connect. The socket bit can then engage with a nut or bolt for loosening or tightening, in which the rotational torque output by the socket bit is derived from the rotational force exerted against the input rod by, for example, a power drill.

The input rod is statically attached to an input gear positioned inside the offset nut driver's housing, or enclosure. Upon rotation of the input rod, such as by the power drill, the input gear turns in kind with the input rod. An idle gear that is positioned adjacent to and which engages with the teeth of the input gear rotates in kind with the input gear. The idle gear then translates that rotational movement to an output gear, which translates the rotational movement to the output spline, the attached output socket bit, and ultimately the target bolt. Depending on the implementation, the gears may be linearly arranged or be in some other non-linear arrangement. For example, the output gear may be orthogonal to the idle gear, or the input and output gears may create some other acute, orthogonal, or obtuse angle relative to the idle gear. The arrangement of the gears may be influenced by, for example, the shape and size of the housing.

BRIEF DESCRIPTION OF THE DRAWINGS

FIG. 6 shows an illustrative representation of the output drive's downward pressing ball which maintains a socket bit's position when in place;

Like reference numerals indicate like elements in the drawings. Elements are not drawn to scale unless otherwise indicated.

DETAILED DESCRIPTION

Figure 1:
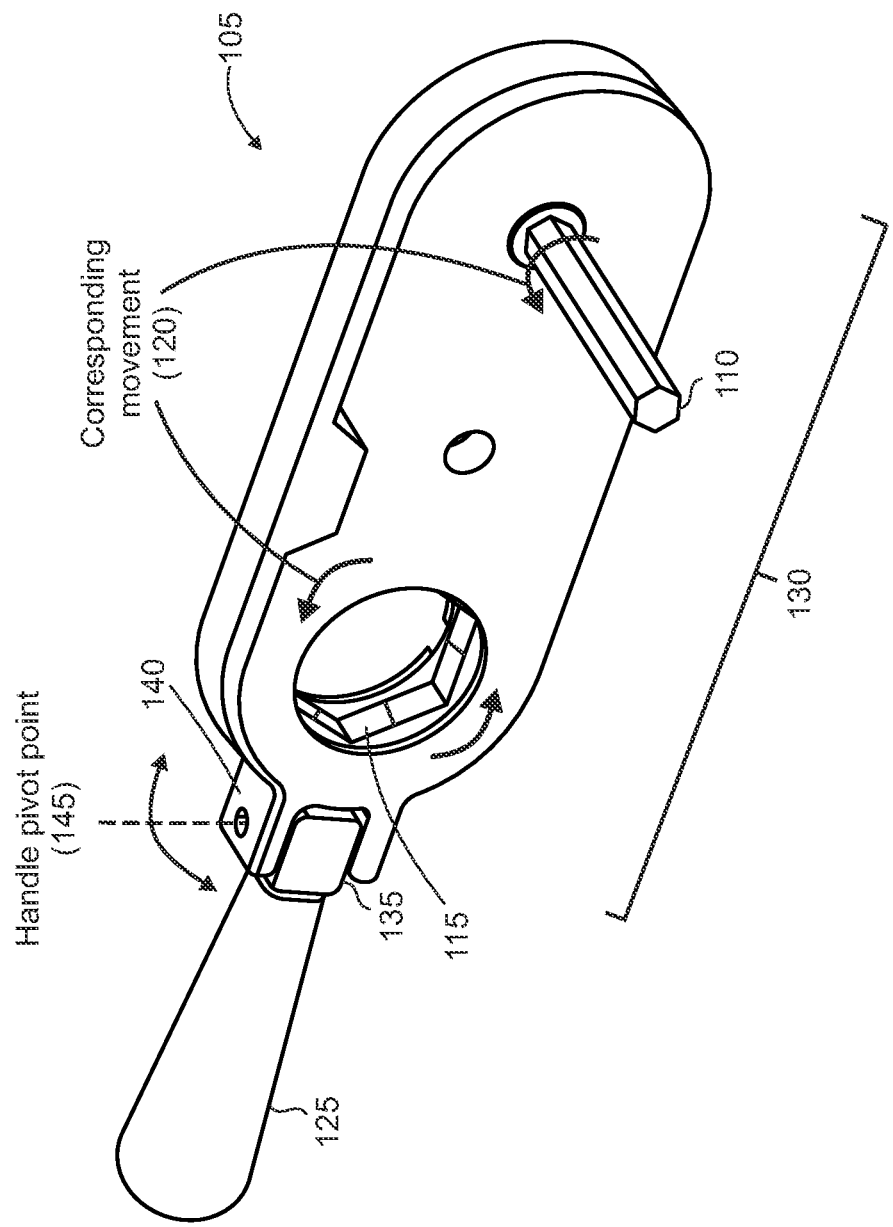
FIG. 1 shows an illustrative representation of the offset nut driver.

FIG. 1 shows an illustrative representation of an offset nut driver 105 ("driver") in which a drill can connect to and rotate an input rod 110 and such rotation translates to an output spline 115 to which a socket bit may be connected. Thus, rotational movement of the input drive results in a corresponding movement 120 to the spline or other output mechanism in other embodiments. The output spline may be a 12-point universal spline so that the spine can be used on metric and SAE (Society of Automotive Engineers) six-point, 12-point, start point, round point, or splined hardware. While a 12-point spline is discussed and referenced herein, other splines may also be used depending on the implementation, such as a six-point spline.

The power-generated rotation of the input rod 110 makes it easier for a user to rotate a bolt by removing—or displacing to the power drill—the need for human strength when using conventional ratchet-socket tools. In typical implementations, the housing or enclosure of the main body 130 may be comprised of a metal, such as aluminum, and may be anodized or powder coated.

The offset nut driver 105 includes a handle 125 that is connected to the main body 130. The handle may likewise be comprised of metal and may also have a textured rubber grip for easier handling. The rubber grip may slide over the aluminum tube of the handle and then be epoxied to a plastic or aluminum male hinge connector 135. The handle can rotate about the handle pivot point 145, in which the male hinge connector connects to the female receptacle portion 140 of the main body. The pivot point is the point at which the male hinge connector and the female receptacle connect and about which the handle can rotate to provide dynamic holding positions during use of the driver. The ability to rotate the handle 125 counteracts the rotational forces that may be felt from the power drill. The handle can be tucked away at 90 degrees for tight spaces and fully out at 180 degrees for control.

Figure 2:
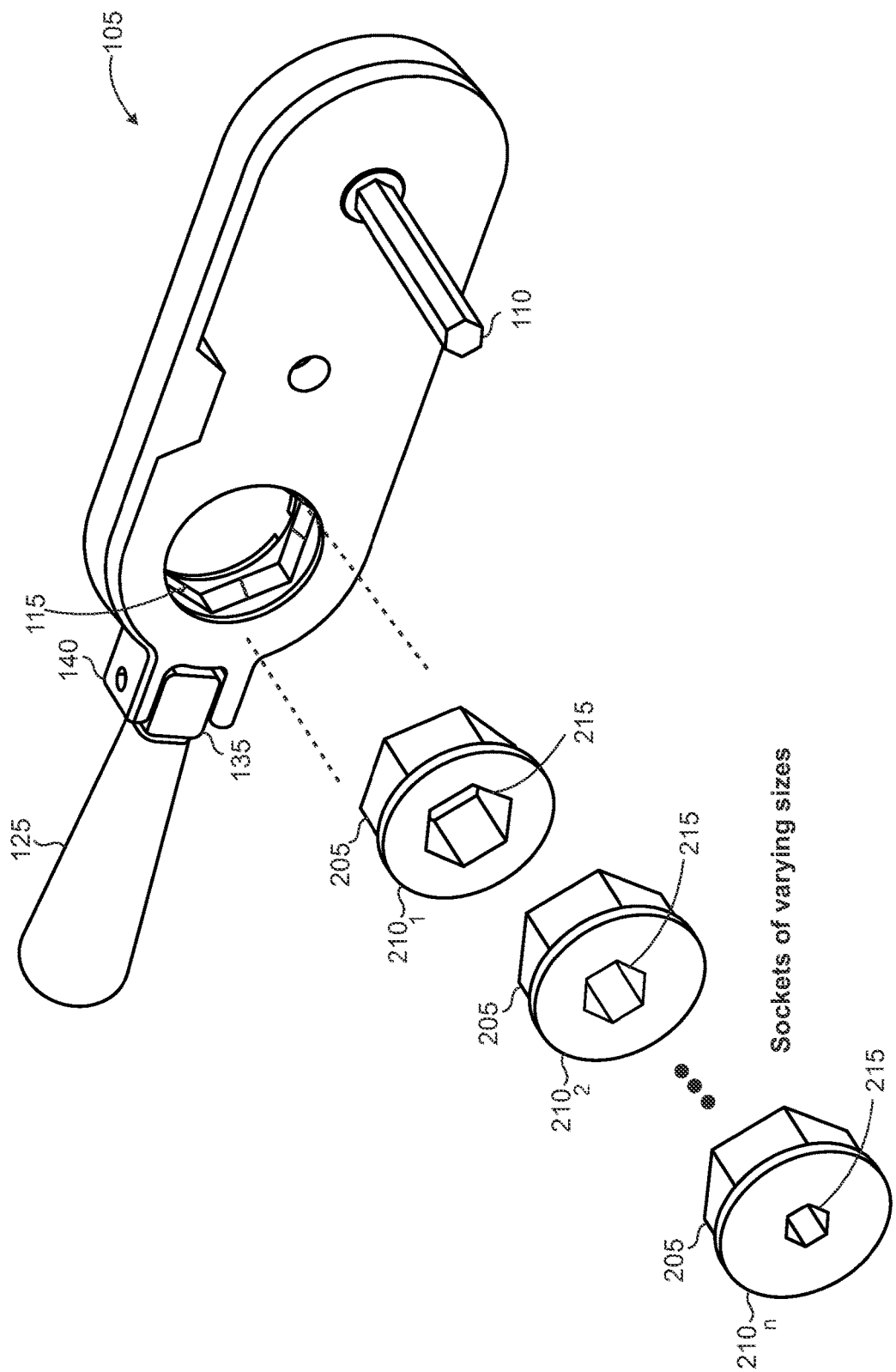
FIG. 2 shows an illustrative representation of varying sized sockets fitting into an output drive of the offset nut driver.

FIG. 2 shows an illustrative representation in which a socket bit 210 can fit into and secure to the output spline 115 of the offset nut driver 105. The male hex portion 205 of the socket bit fits into and secures to the output spline, and the female hex portion 215 can be used to engage with a nut or bolt. Socket bits 210 of varying sized female hex portions 215 can be utilized with the driver so that the driver can be used with an array of differently sized nuts and bolts. While hex socket bits are described herein for the output spline, other output sockets may also be used, such as torx bit sockets.

Figure 3:
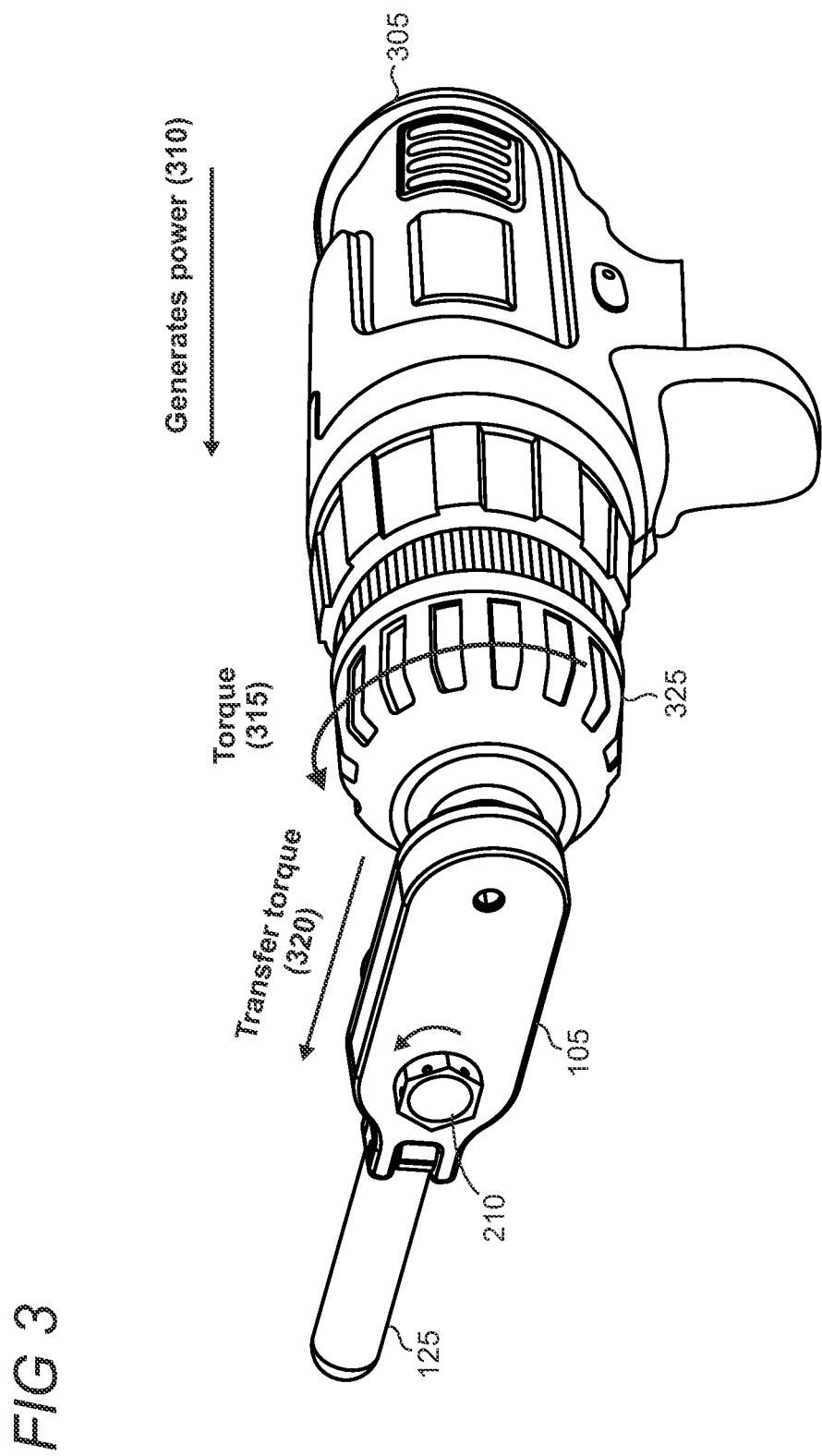
FIG. 3 shows an illustrative representation in which a power drill generates transferrable torque for the offset nut driver.

FIG. 3 shows an illustrative use scenario in which a power drill 305 is connected to the input rod (not shown). The power drill generates power 310 which creates torque 315 for the chuck 325. When the drill's receptacle on the chuck is secured to the input drive, which functions as a bit for the drill, the generated rotational torque is transferred to the output drive and thereby the attached socket bit 210, as representatively shown by numeral 320, and which will be discussed in greater detail below.

Figure 4:
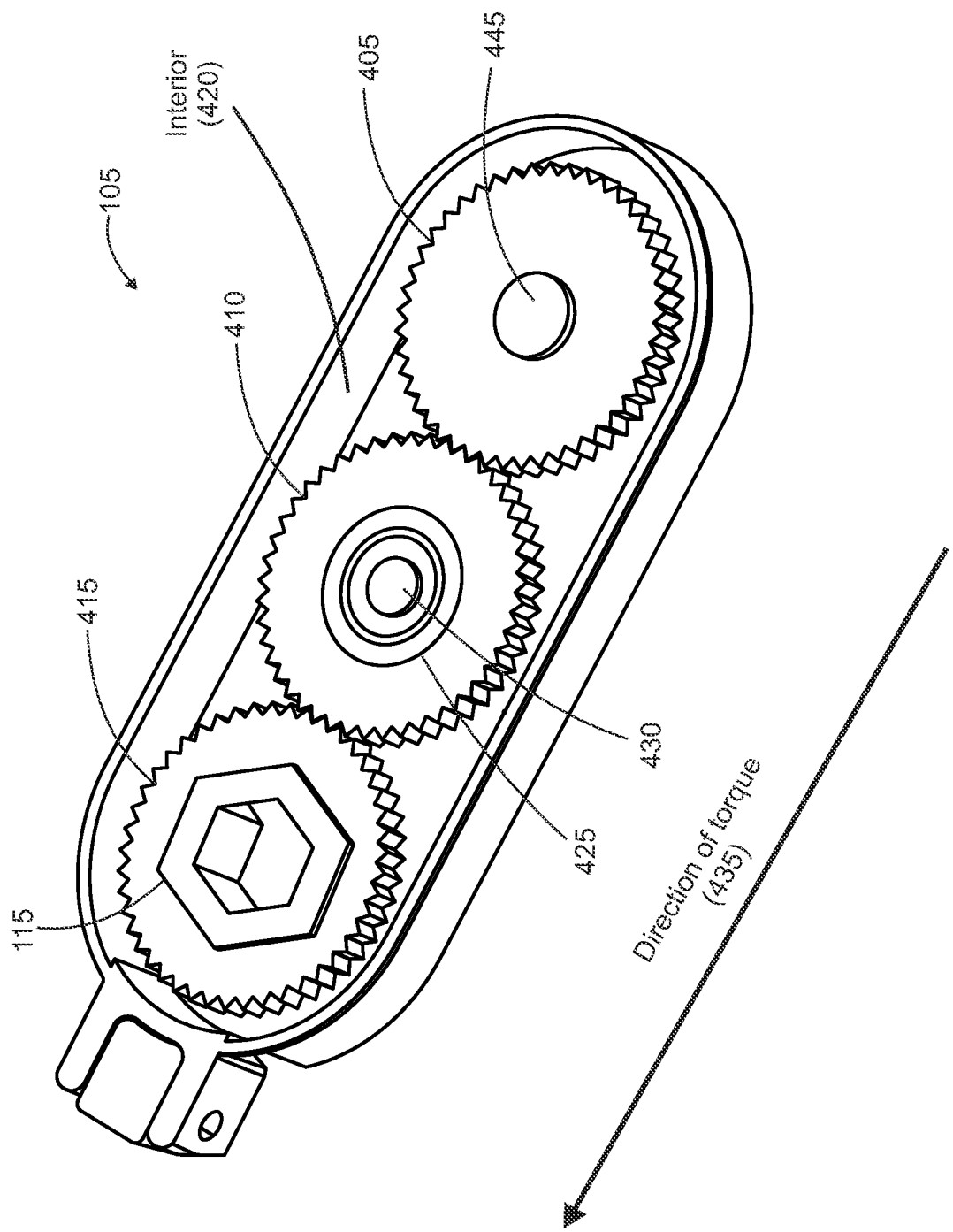
FIG. 4 shows an illustrative representation of the inside gears of the offset nut driver.

FIG. 4 shows an illustrative representation of the main body's interior 420, in which multiple gears are arranged to facilitate the transfer of torque from the input drive (not shown in FIG. 4) to the output spline 115. The input gear 405 includes a hole 445 inside which a base of the input rod is secured and attached, to thereby create the translational movement between the components. An idle gear 410 is positioned adjacent to the input gear in which the teeth of both gears overlap to enable the transfer of rotational movement between the gears, namely from the input gear to the idle gear. The idle gear includes and is mounted directly on a single bearing 425 that rotates on a pin 430 that extends through the bearing. The pin spans across opposing sides of the main body's enclosure.

The output gear 415 is positioned adjacent to the idle gear 410 in which the teeth of both gears likewise overlap to enable the transfer of rotational movement, namely from the idle gear to the output gear. In typical implementations, a direction of torque moves from the input gear 405 toward the output gear, as representatively illustrated by numeral 435. Upon the output gear receiving the rotational movement from the idle gear, the output gear rotates the statically connected output spline 115. The output gear and spline may be a single body so that any movement of the gear securely translates to the spline, and ultimately to the socket bit and a target nut or bolt.

In the present implementations, the input gear 405 is smaller than the idle and output gears 410, 415 such that the ratio is 1:1:3. This ratio configuration slows down the output spline 115 and increases torque. However, in other implementations, the gear ratios may be 1:1:1 or some other ratio to, for example, make the offset nut driver 105 feel and function as if it were directly attached to the drill 305 (FIG. 3). The idle gear, however, can change sizes without effecting this gear ratio.

The length of the offset nut driver 105 and the number of gears provides a length that may reduce the rotational forces felt by the user. Typically, the longer the tool the less rotational forces are felt. Furthermore, the current design contemplates a minimum gear diameter that allows for a large enough output socket. While a certain number, arrangement, and size of gears is shown herein, other arrangements, sizes, and number of gears are also possible with a given implementation. For example, more than three gears that are touching to enable the transfer of torque can be possible with a non-linear arrangement and with other sized gears. The gears may likewise each be congruent in size or may each have distinct sizes depending on the implementation, which may in part be influenced by the amount of rotational forces desired to be felt or the desired size and shape of the main body's enclosure. For example, the idler gear may be smaller which would allow the driver's length to shrink without effecting the output drive size, although in other implementations the driver can be designed as large as possible to minimize the stress on the idle gear.

Figure 5:
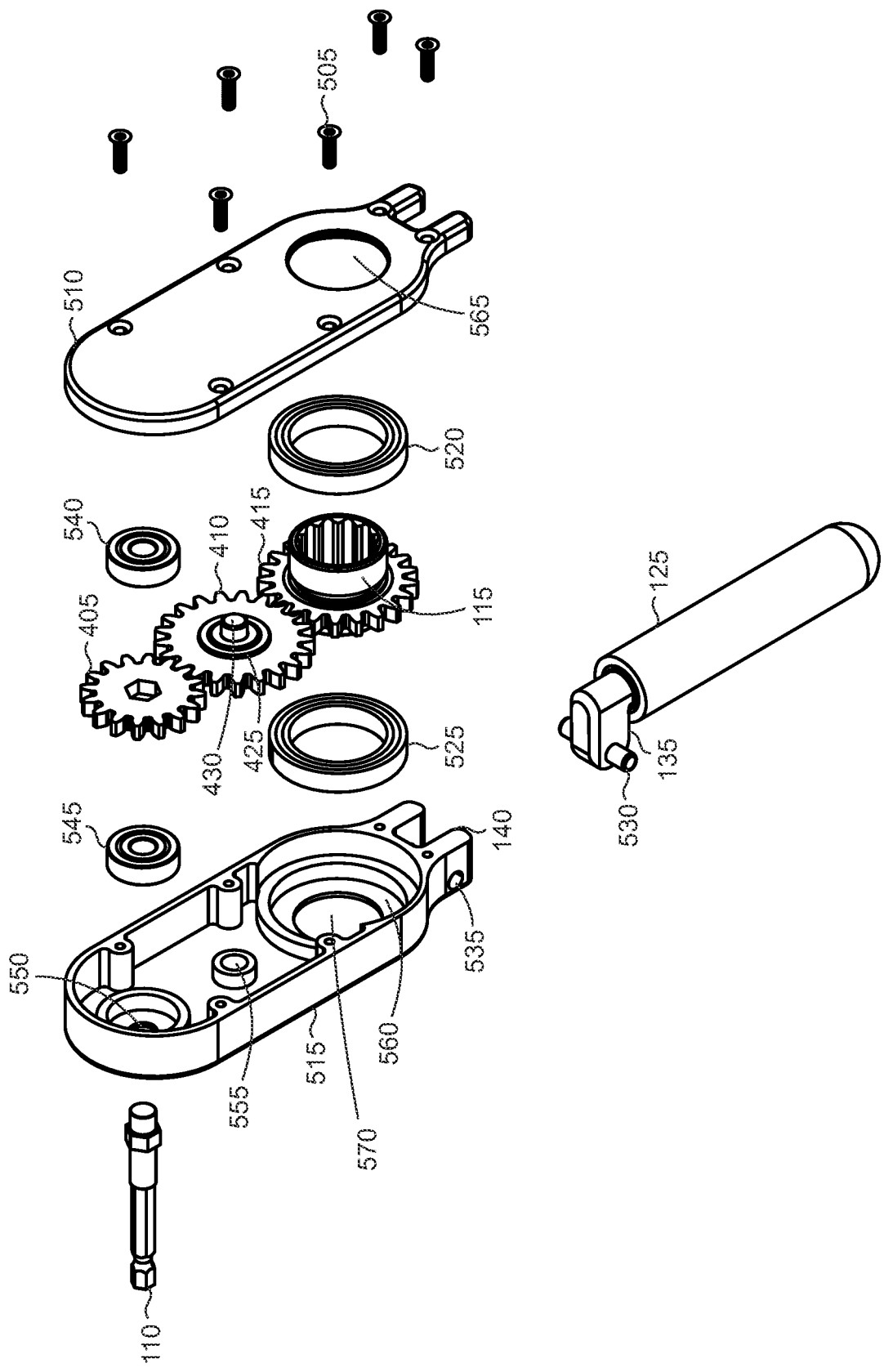
FIG. 5 shows an illustrative exploded view of the offset nut driver's components.

FIG. 5 shows an illustrative exploded view of the offset nut driver 105. The main body 130 consists of a base housing 515 and a cover 510 which attaches to the base housing by, for example, screws 505. Other attachment means are also possible, such as adhesive, tab and notch or press fit mechanisms, or any combination thereof. The enclosure can be designed to be a minimum of IP53 certified which indicates dust and water resistance. The bearings may also be sealed or at the least shielded so that if dust gets inside the body, the driver will still function properly.

Inside of the enclosure's interior are the various mechanical components that facilitate the offset nut driver's functions. In typical implementations, the mechanical components, including the gears, input rod, and output mechanism, may be comprised of a high strength steel, such as high-strength carbon or low-alloy steel or titanium, to provide sufficient durability during use.

The input rod 110 is received inside a hole 550 (partially shown) of the base housing 515, which is then received into holes of the bearings 545 and 540 positioned on opposing sides of the input gear 405. The bearings may be utilized to make sure the gears are properly centered. In typical implementations, the input rod may be an input hex shaft, or drive shaft, that is ¼ in diameter and compatible with power drills or impact wrenches, among other tools.

The base housing 515 includes a cavity 555 inside which the pin 430 of the idle gear is received, which may likewise be positioned on the opposite side of the cover 510 (not shown). Each side of the output spline 115 of the output gear fits within a respective hole 565 and 570 of the cover 510 and the base housing 515, respectively.

The handle 125 is attached to the main body 130 of the offset nut driver 105 via the male hinge connector 135 and the female receptacle portion 140. The male hinge connector includes pins 530 that extend from opposing ends thereof, and each pin is secured inside corresponding holes 535 on the female receptacle portion. The shape and size of the male hinge connector may, at least in part, correspond to a shape and size of the female receptacle portion's cutout to provide a snug fit. The hinge may likewise pivot about the pins and holes (FIG. 1).

FIG. 6 shows illustrative representations of the output gear 415 and output spline 115, in which an inside perimeter of the spline includes a ball 605 comprised of, for example, high-strength steel. The ball is positioned inside of the spline and enters inside the spline's empty center area to engage with a socket bit and thereby fasten the socket bit to the output spline. The ball can be seen inside a groove 610 that is arranged between the spline and the gear on the outside surface of the output mechanisms (e.g., the spline and gear). The ball may be comprised of a high strength steel, and the hole inside the spline in which the ball is placed is configured with some empty space to enable the ball to move up and down in small increments. The movable increments of the ball provided by the space is such that the socket bit can be received inside the spline and then secured in place via the downward pressure of the ball.

Figure 7:
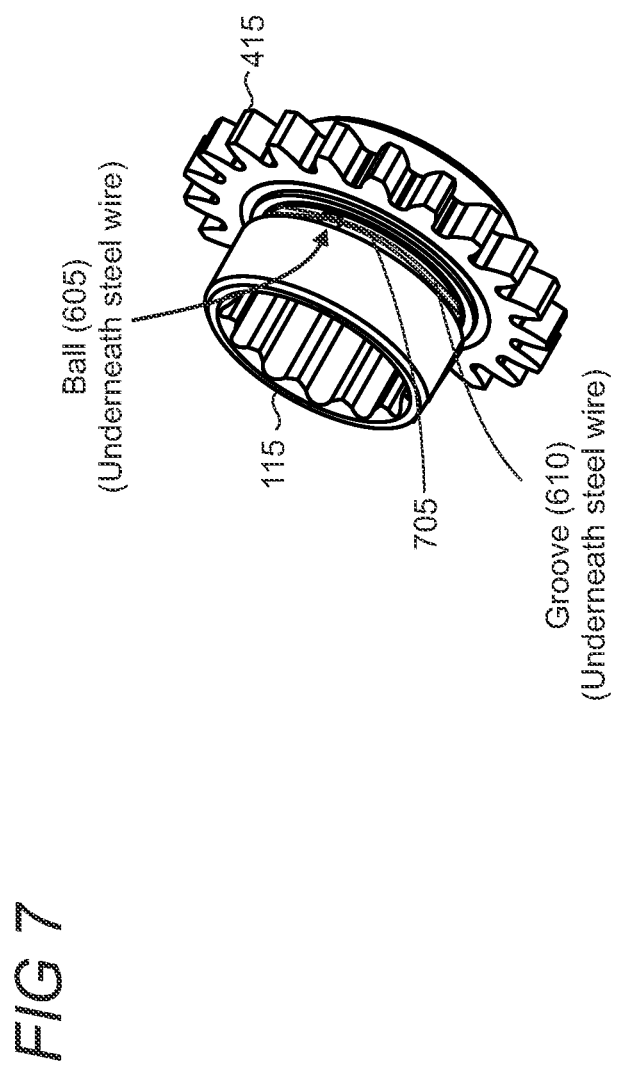
FIG. 7 shows an illustrative representation of steel wire positioned around and which applies pressure to the output drive's groove.

FIG. 7 shows an illustrative representation of the output gear 415, in which a steel wire 705 is implemented around the groove 610. The steel wire captures the ball inside of its counter-bored hole to prevent the ball from escaping, and also allows the ball to move up and down within the incrementally available space while providing a downward spring force. The spring force provided by the steel wire keeps the ball pressing on the outside of the socket bit, thereby making the socket bit secure.

Figure 8:
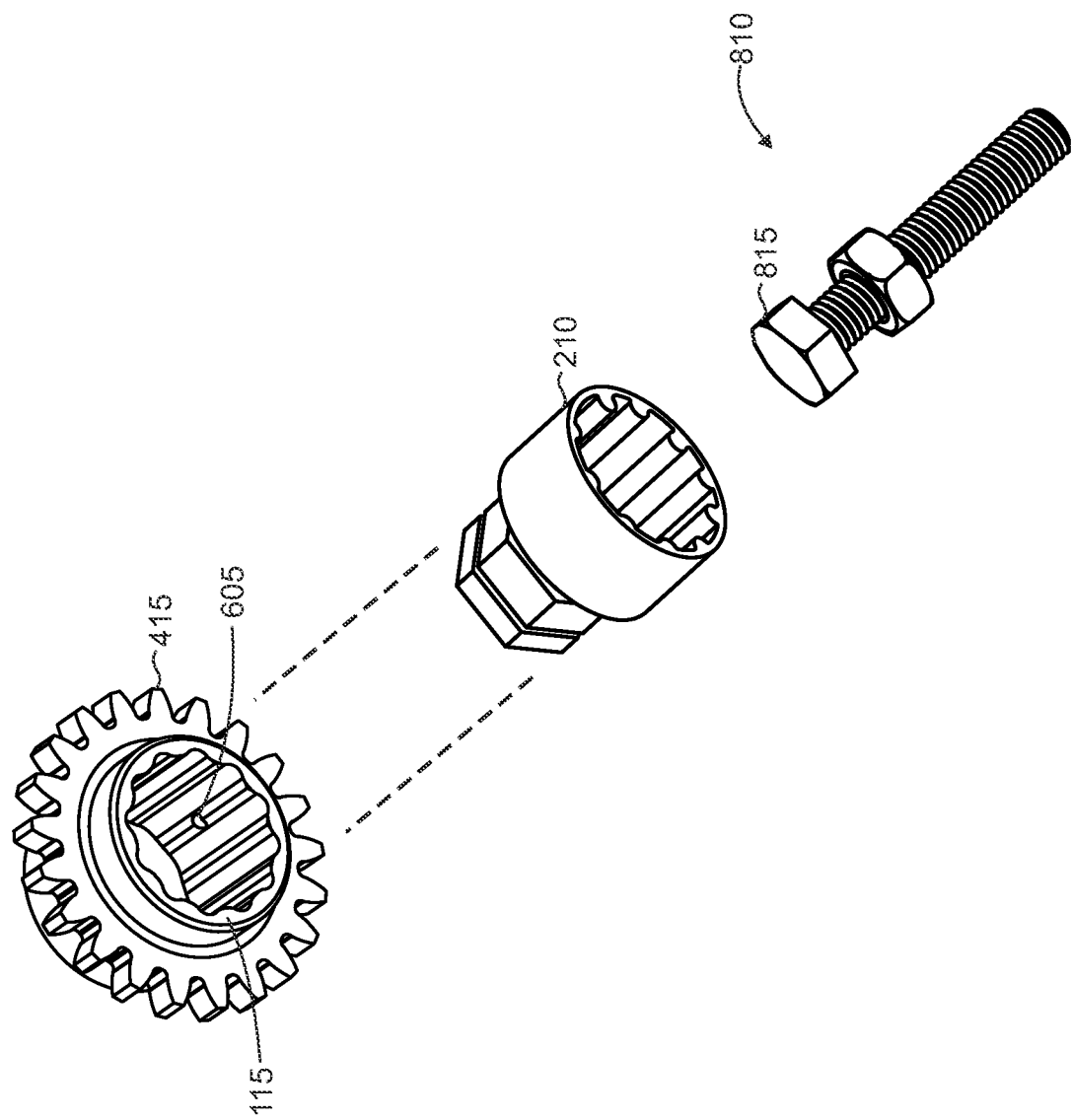
FIG. 8 shows an illustrative representation of a socket bit aligned with the output drive.

FIG. 8 shows an illustrative representation in which the socket bit 210 engages inside the output spline 115 and is secured in place via the ball 605, which presses against the male hex portion of the socket when engaged. The female socket portion of the socket bit can engage with the head 815 of the bolt 810 for loosening or tightening.

Figure 9:
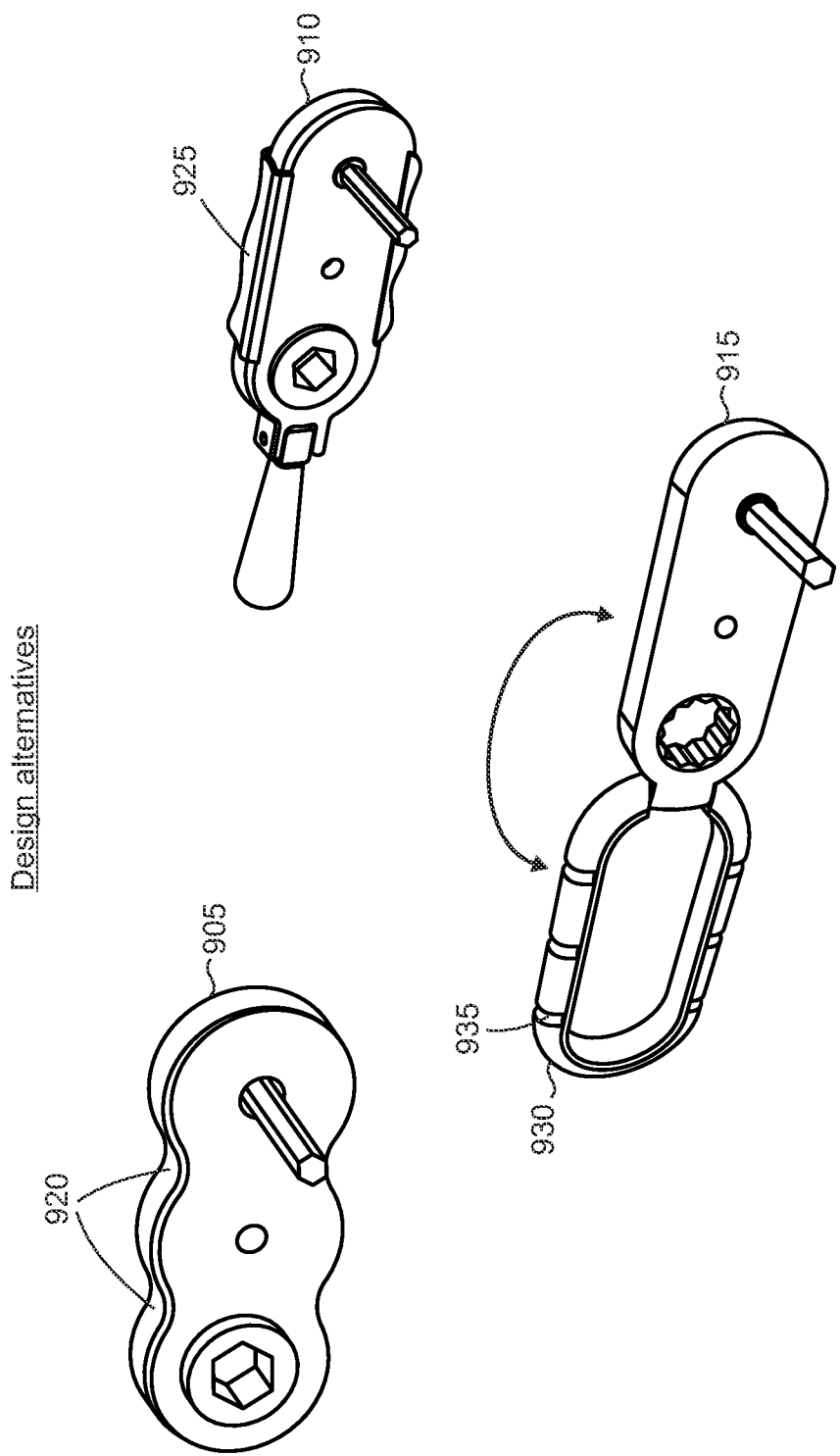
FIG. 9 shows illustrative representations of design alternatives of the offset nut driver.

FIG. 9 shows illustrative design alternatives of the offset nut driver 105, as representatively shown by numerals 905, 910, and 915. The driver 905 includes grooves 920 on its housing to accommodate a user's hand grip but does not include a physical handle that extends outward therefrom. The driver 910 includes an additional layer of protection 925, which may be comprised of steel, plastic, or rubber, around the enclosure to provide greater protection for the main body of the device.

Offset nut driver 915 includes an alternative handle mechanism that can rotate about the driver's body and be used in multiple positions. The handle 930 can rotate off the driver's main body to provide the user with a grip when using the driver, and the handle can rotate back toward and encase the perimeter of the driver's body to provide an added layer of protection when not in use. The handle in this implementation may be comprised of rubber, at least on the outside, and have grooves 935 which provide greater handling to the user. The handle 930 may be configured such that its inside perimeter may press-fit against the main body's external perimeter.

Various embodiments of the offset nut driver can be implemented. One embodiment includes an offset nut driver, comprising: an input drive to receive external force; an input gear which is connected to the input drive and which rotates upon receipt of the external force at the input drive; an output gear to which the input gear is directly or indirectly connected and which correspondingly rotates based on the input gear's rotational movement; and an output spline to which the output gear's rotational movement translates.

In another example, the input drive is an input rod. As another example, the input rod is hex shaped. In another example, the output spline is a 12-point universal spline. In that example, when the output spline is engaged with socket bit, and rotational movement translated onto the output spline causes the socket bit to correspondingly rotate in a same direction of the external force received at the input drive. As a further example, the offset nut driver further comprises an idle gear which is positioned between and simultaneously engages the input and output gears, and which passes the translational movement from the input gear to the output gear. In that example, the input gear and the output gear are positioned on opposing sides of the idle gear. In a further example, the input, output, and idle gears are arranged linearly. As another example, the offset nut driver further comprises a steel wire coiled around a groove that is positioned between the output spline and the output gear. In another example, the offset nut driver further comprises a ball positioned inside a hole of the output spline and which, at least in part, enters an empty center area of the output spline, wherein the steel wire exerts pressure against the ball and in turn the ball exerts pressure against a socket bit to secure the socket bit inside the output spline.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An offset nut driver, comprising:
   an input drive to receive external force;
   an input gear which is connected to the input drive and which rotates upon receipt of the external force at the input drive, wherein distinct bearings are positioned on opposing sides of the input gear, and wherein the input drive at least partially inserts through holes on the input gear and each bearing;
   an output gear to which the input gear is directly or indirectly connected and which correspondingly rotates based on the input gear's rotational movement; and
   an output spline to which the output gear's rotational movement translates, in which the output spline is a 12-point universal spline.

2. The offset nut driver of claim 1, wherein the input drive is an input rod.

3. The offset nut driver of claim 2, wherein the input rod is hex shaped.

4. The offset nut driver of claim 1, wherein, when the output spline is engaged with a socket bit, rotational movement translated onto the output spline causes the socket bit to correspondingly rotate in a same direction of the external force received at the input drive.

5. The offset nut driver of claim 1, further comprising an idle gear which is positioned between and simultaneously engages the input and output gears, and which passes the translational movement from the input gear to the output gear, wherein the idle gear is mounted on a bearing at the idle gear's aperture.

6. The offset nut driver of claim 5, wherein the input gear and the output gear are positioned on opposing sides of the idle gear.

7. The offset nut driver of claim 6, wherein the input, output, and idle gears are arranged linearly.

8. The offset nut driver of claim 1, further comprising a steel wire coiled around a groove that is positioned between the output spline and the output gear.

9. The offset nut driver of claim 8, further comprising a ball positioned inside a hole of the output spline and which, at least in part, enters an empty center area of the output spline, wherein the steel wire exerts pressure against the ball and in turn the ball exerts pressure against a socket bit to secure the socket bit inside the output spline.

10. An offset nut driver, comprising:
    an input drive to receive external force;
    an input gear which is connected to the input drive and which rotates upon receipt of the external force at the input drive;
    an output gear to which the input gear is directly or indirectly connected and which correspondingly rotates based on the input gear's rotational movement; and
    an output spline to which the output gear's rotational movement translates, in which the output spline is a 12-point universal spline.

11. An offset nut driver, comprising:
    an input drive to receive external force;
    an input gear which is connected to the input drive and which rotates upon receipt of the external force at the input drive;
    an output gear to which the input gear is directly or indirectly connected and which correspondingly rotates based on the input gear's rotational movement;

an output spline to which the output gear's rotational movement translates; and a steel wire coiled around a groove that is positioned between the output spline and the output gear.

\* \* \* \* \*